Dec. 7, 1926.

C. P. ASTROM 1,610,074

UNIVERSAL JOINT FOR DRIVING DUMP CAR BODIES

Filed August 18, 1922    2 Sheets-Sheet 1

INVENTOR
Carl P. Astrom
BY
ATTORNEY

Dec. 7, 1926.  
C. P. ASTROM  
1,610,074  
UNIVERSAL JOINT FOR DRIVING DUMP CAR BODIES  
Filed August 18, 1922  2 Sheets-Sheet 2

INVENTOR
Carl P. Astrom
BY
ATTORNEY

Patented Dec. 7, 1926.

1,610,074

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

UNIVERSAL JOINT FOR DRIVING DUMP-CAR BODIES.

Application filed August 18, 1922. Serial No. 582,577.

This invention relates to tilting and laterally moving cinder or hot metal dump cars and has for its object to provide means adapted to prevent strains or breakage of parts in event the car body trunnions get out of alignment with the racks. Another object is to provide a dumping car having a stationary and a movable cylinder connected therewith, one of which is for tilting and the other for checking the movement of the car body.

The usual form of tilting and laterally moving dump car body is mounted to tilt and roll on trunnions along a track and is driven by a reciprocating motor. There is considerable danger of dirt, cinders, etc., getting into the rack teeth. Should such dirt clog the track or rack teeth or for any other reason cause one of the trunnions to roll ahead of the other and out of alignment, there is danger of rupture in some part since the driving connection between the motor and trunnion is not ordinarily adapted to be moved out of its plane of motion to accommodate such misalignment.

The present invention is adapted to remove this danger of breakage by the provision of a universal joint within the driving member or crosshead which engages a projecting lug on one of the trunnion members. This invention is particularly adapted to single dump cars, that is, those adapted to dump to only one side instead of both and to those cars having a stationary driving cylinder and a movable oil cylinder located at one side of the driving piston rod for governing the movement of the driving piston and trunnions. When a movable oil cylinder of this type is provided, the main driving piston rod and piston are not capable of turning about their longitudinal axis and means is therefore provided to allow one end of the trunnions to be raised above the other without having to turn the driving member or impart any dangerous torsional or flexural strains to it. Within the crosshead or driving member and surrounding the driving lug on one of the trunnions are a pair of bearing members each adapted to turn about an axis at 90° to the axis about which the other bearing member is capable of rotating. In order to permit the driving end of the trunnions to be raised or lowered the bearing members are made slidable together substantially vertically within the crosshead.

Referring to the drawings.

Figure 1:
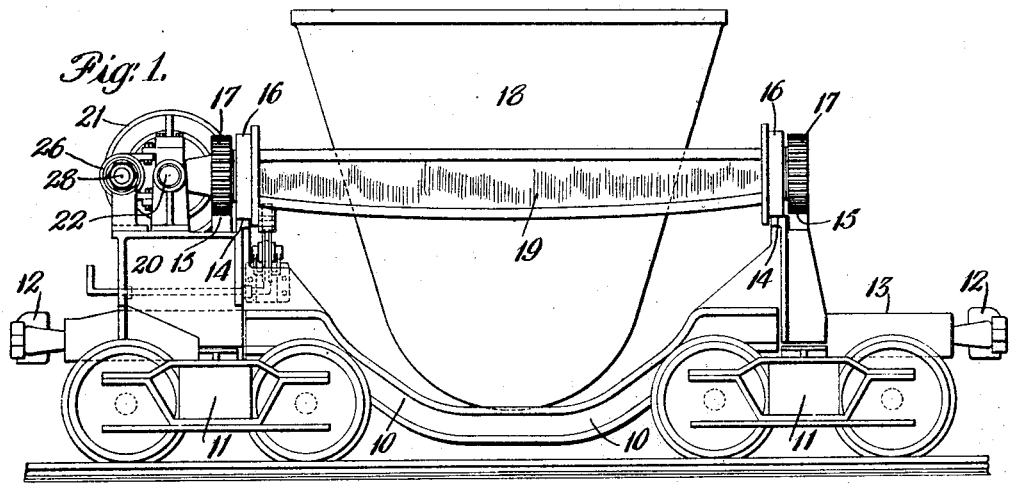
Fig. 1 shows a side view of a dumping car to which the invention has been applied.
Figure 2:
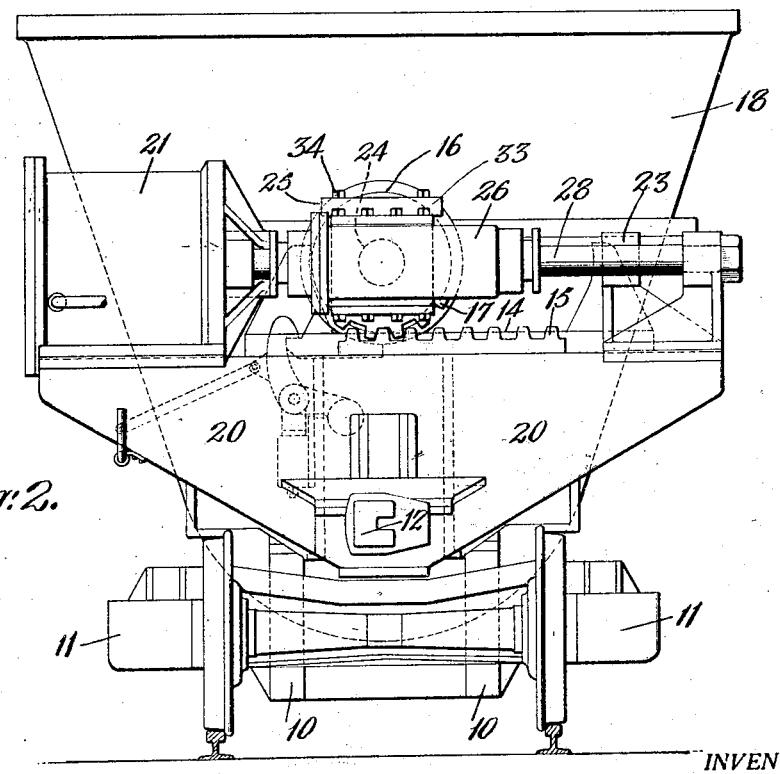
Fig. 2 is a left hand end view of the device showing in Fig. 1.
Figure 3:
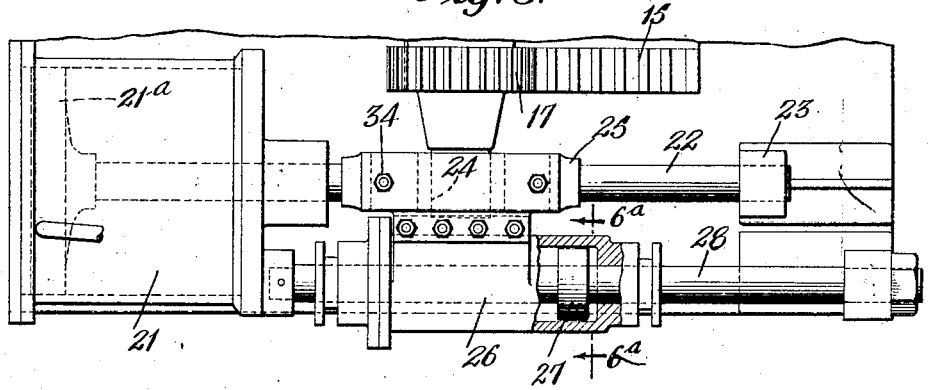
Fig. 3 is an enlarged plan view of a driving motor and coupling.

The numeral 10 on the drawing indicates the underframe supported at each end on trucks 11 provided with the customary coupling equipment 12 and having thereon a platform 13 on which is mounted supports for the track rails 14 and the rack 15. The dumping car body 18 is mounted in a suitable yoke member 19 supported at each end on trunnions 16 which are adapted to roll along the track 14 in tilting. Gears 17 cooperate with the teeth of the rack 15 to prevent sliding. Located on one of the platforms 13 is a support 20 for a fluid pressure motor 21. A lug 24 projects out from one of the trunnions and is adapted to be moved by the motor 21 through the piston 21ª, piston rod 22 slidable within the bearing 23, and the crosshead 25. Bolted or otherwise secured to one side of the piston rod and crosshead is the hydraulic cylinder 26 for retarding the movement of the driving member and trunnions. This is accomplished by having the moving cylinder filled with oil and sliding over a stationary piston 27 and piston rod 28. By either or both the provisions of appropriate clearance between the piston 27 and the cylinder 26 and the use of a number of small openings 35 within the piston 27, movement of the oil from one side of the piston to the other is necessarily slow to thus cushion the movement of the dump car body.

Figure 4:
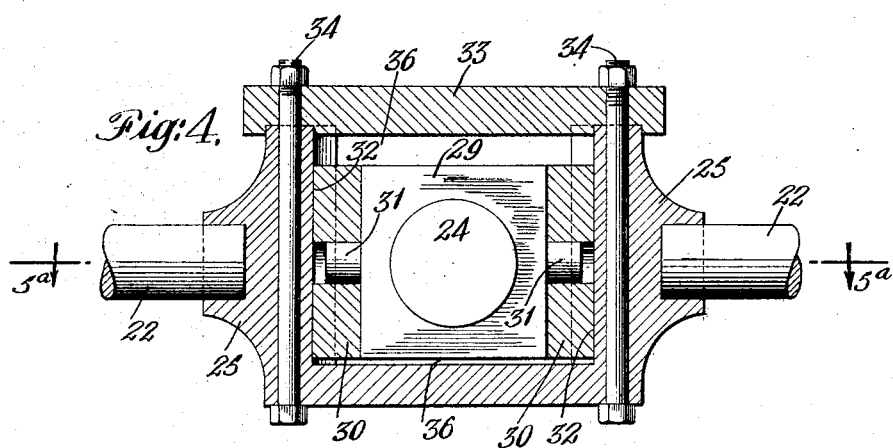
Fig. 4 is a section on the line 4ª—4ª of Fig. 5.
Figure 6:
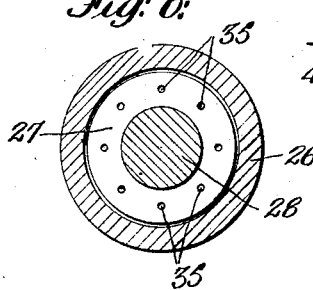
Fig. 6 is a section on the line 6ª—6ª of Fig. 3.
Figure 5:
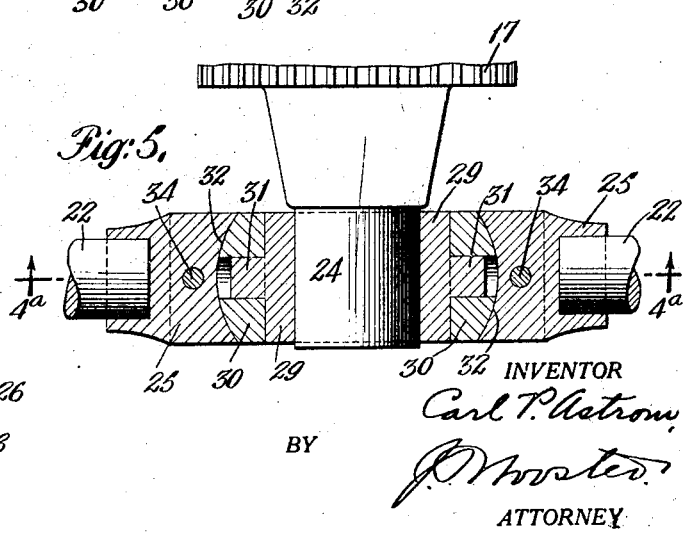
Fig. 5 is a section on the line 5ª—5ª of Fig. 4 and shows a detail plan view of the universal joint.

Due to any number of causes, it sometimes happens that one end of the trunnions 16 is moved up and ahead of the other end and out of its usual position at substantially right angles to the driving piston rod 22. It will therefore be seen that if excessive torsional or flexural strains are not to be transmitted to the crosshead 25 and piston rod 22, that some means must be provided to permit the trunnions to be moved out of alignment. This is accomplished by the use of a universal joint within the crosshead 25 and shown by Figs. 4 and 5. Located within the crosshead are a pair of bearing members 29 and 30 one within the other and each adapted to rotate about an axis at 90° to the axis about which the other member rotates. For purposes of illustration the bearing member 29 is shown as being made solid but it will be understood that this member may be made in several parts if desired in order to compensate for wear. In order to allow for movement of the trunnion axis in a vertical plane, the bearing member 29 is mounted on pivots 31 so that this bearing member may rotate about a horizontal axis through the center of the trunnion lug 24.

To take care of movement of the trunnion axis in a horizontal plane, the bearing member 30 is made convex on its lateral faces 32 and curved on a radius to the center of the trunnion lug 24. The inside lateral faces of the crosshead 25 are made convex on the same radius to cooperate with the curvature given the lateral faces of the bearing member 30. Movement of the trunnion axis in a horizontal plane results in a movement of the bearing member 30 about a vertical axis through the center of the trunnion lug 24, the bearing members 29 and 30 are made slidable to move within the crosshead and for this purpose appropriate clearance space 36 above and below the bearing members may be provided. In the embodiment illustrated the crosshead is made U-shaped and provided with a bridging member 33 across the top and secured by shoulders 34 to limit the vertical movement of the bearing members 29 and 30.

What I claim is:

1. The combination in a dumping car with a tilting and laterally moving car body, of trunnions on which the same is mounted, a laterally extending driving member connected to a trunnion for dumping said car body, a motor for actuating the driving member, and a universal joint connected to said driving member and located between trunnion and member for permitting rotation of the trunnion axis without interruption of or disconnection in said universal joint.

2. The combination in a dumping car with a tilting and laterally moving car body, of trunnions on which the same is mounted, a laterally extending driving member connected to a trunnion for dumping said car body, a motor for actuating the driving member, and a universal joint connected to said driving member and located between the motor and trunnion for permitting rotation of the trunnion axis without interruption of or disconnection in said universal joint.

3. The combination with a dump car body for single dumping, of trunnions on which the car is mounted, a track along which the trunnions may roll, a stationary fluid pressure cylinder, piston and piston rod for moving the trunnions, a crosshead between said piston rod and trunnions, a movable hydraulic cylinder at one side of and connected with said piston rod for governing the movement of said car body, a stationary piston within said movable cylinder and a universal connection between said crosshead and trunnions.

4. A dump car body mounted on trunnions, a track along which the trunnions are adapted to roll, a reciprocal driving member for moving the trunnions and a universal joint between said driving member and trunnions and comprising a pair of bearing members, one within the other and adapted for rotation about axes at right angles.

5. The combination with a dump car body, of a trunnion supporting the same, a reciprocable member for rotating said car body on said trunnion, a cross-head connecting said member and trunnion, and a movable checking cylinder secured to said cross-head on one side thereof, a stationary piston rod and piston inside said checking cylinder, and a stationary motor cylinder located at one end of the checking cylinder.

6. The combination with a dump car body mounted on trunnions, of a track along which the trunnions are adapted to roll, a reciprocal driving member for moving the trunnions and a universal joint between said driving member and trunnions and comprising a pair of bearing members, one within the other, a projecting lug on a trunnion adapted to extend within the driving and within the bearing members, one of said bearing members being in cooperation with the lug and being substantially horizontally pivoted to the outer bearing member both bearing members being slidable substantially vertically within the driving member and the outer bearing member being rotatable about a substantially vertical axis through the center of the trunnion lug.

7. The combination with a dump car body, of a trunnion supporting the same, reciprocable piston rod for rotating said car body on said trunnion, a stationary motor cylinder with a movable piston alined with said piston rod for driving the same, a movable checking cylinder located at one side of and close to said piston rod with its end spaced from the adjacent end of the motor cylinder.

8. The combination in a dumping car with a tilting and laterally moving car body, of trunnions on which the same is mounted, a laterally extending driving member connected to a trunnion for dumping said car body, a universal joint between said driving member and trunnion, and guideways connected to said universal joint and in which any vertical movement between the trunnion and driving member occurs.

9. The combination in a dumping car with a tilting and laterally movable car body of trunnions on which the same is mounted, a motor for tilting said car body, a laterally extending driving member between the motor and a trunnion, a cross head connecting said driving member and trunnion, and a universal joint within said cross head.

Signed at New York in the county of New York and State of New York this 11th day of August A. D. 1922.

CARL P. ASTROM.